(12) United States Patent
Hanes

(10) Patent No.: US 10,506,797 B2
(45) Date of Patent: Dec. 17, 2019

(54) URINARY INCONTINENCE DEVICE FOR ANIMALS

(71) Applicant: Marilyn White Hanes, Molt, MT (US)

(72) Inventor: Marilyn White Hanes, Molt, MT (US)

(*) Notice: Subject to any disclaimer, the term of this patent is extended or adjusted under 35 U.S.C. 154(b) by 478 days.

(21) Appl. No.: 15/424,863

(22) Filed: Feb. 5, 2017

(65) Prior Publication Data

US 2018/0221223 A1  Aug. 9, 2018

(51) Int. Cl.
*A01K 23/00* (2006.01)
*A01K 1/01* (2006.01)
*A01K 13/00* (2006.01)

(52) U.S. Cl.
CPC ............ *A01K 23/00* (2013.01); *A01K 1/0107* (2013.01); *A01K 13/006* (2013.01)

(58) Field of Classification Search
CPC ..... A01K 23/00; A01K 1/0107; A01K 13/006
See application file for complete search history.

(56) References Cited

U.S. PATENT DOCUMENTS

| | | | |
|---|---|---|---|
| 4,324,245 A * | 4/1982 | Mesek | A61F 13/49011 604/370 |
| 4,577,591 A | 3/1986 | Wesseldine | |
| 5,555,847 A | 9/1996 | Kelly | |
| 6,142,105 A | 11/2000 | McKnight | |
| 6,368,313 B1 * | 4/2002 | Howard | A01K 23/00 119/850 |
| 6,675,745 B1 | 1/2004 | Brewington | |
| 6,837,191 B2 | 1/2005 | Brewington | |
| 6,895,901 B1 | 5/2005 | Howard | |
| 6,935,278 B2 | 8/2005 | Brewington | |
| 7,464,668 B2 | 12/2008 | Brewington | |
| 7,753,008 B2 | 7/2010 | Krenkel | |
| D664,310 S * | 7/2012 | Ito | A01K 27/002 D30/144 |
| 8,302,565 B2 | 11/2012 | Williams | |
| 8,381,688 B1 * | 2/2013 | Wejrowski | A01K 27/002 119/792 |
| 8,992,495 B1 | 3/2015 | Howell | |
| 10,238,090 B2 * | 3/2019 | Zoltanski | A01K 23/00 |
| 2004/0074450 A1 | 4/2004 | Soares et al. | |
| 2004/0244726 A1 | 12/2004 | Brewington | |
| 2004/0244727 A1 | 12/2004 | Brewington | |
| 2006/0096551 A1 | 5/2006 | Brewington | |

(Continued)

*Primary Examiner* — Tatyana Zalukaeva
*Assistant Examiner* — Gabriella E Burnette
(74) *Attorney, Agent, or Firm* — Antoinette M. Tease (57) ABSTRACT

A urinary incontinence device for animals comprising a main panel with a first wing, center section, second wing, and crotch section that are laterally allied to form a single rectangular shape. The wings, center section and crotch section are comprised of three layers of fabric cut from the same pattern, including an outer waterproof cover, an intermediate absorbent layer, and an inner wicking layer. The invention further comprises a removable absorption pod comprised of a waterproof outer holder and one or more absorbent cloths contained within the waterproof outer holder. A pair of suspender strips extends perpendicularly from a front edge of the first and second wings and are configured to attach to a harness. Each suspender strap terminates in a removable harness adapter, which is attached to the suspender strap via a quick-release connector.

24 Claims, 6 Drawing Sheets

(56) References Cited

U.S. PATENT DOCUMENTS

| | | | |
|---|---|---|---|
| 2006/0196447 A1* | 9/2006 | Poh-Beyerlein | A01K 23/00 119/869 |
| 2007/0012263 A1 | 1/2007 | Hammonds | |
| 2007/0163520 A1 | 7/2007 | Krenkel | |
| 2010/0154716 A1* | 6/2010 | Smith | A01K 1/0107 119/169 |
| 2011/0226193 A1 | 9/2011 | Williams | |
| 2012/0035577 A1* | 2/2012 | Tomes Dietz | A61F 13/15 604/385.24 |
| 2012/0167279 A1* | 7/2012 | Bigney | A41B 9/02 2/401 |

* cited by examiner

URINARY INCONTINENCE DEVICE FOR ANIMALS

BACKGROUND OF THE INVENTION

1. Field of the Invention

The present invention relates generally to the field of urinary incontinence devices for animals, and more particularly, to an incontinence device that is configured to attach to an existing harness system and that includes a removable absorption pod.

2. Description of the Related Art

Various incontinence devices for animals exist, but they suffer from a number of drawbacks in terms of fit, stability and comfort. On males, typical belly bands tend to rotate out of position, a problem that is solved by the crotch design of the present invention. Existing systems also lack sufficient absorbency, whereas the present invention provides virtually unlimited adaptability to increase or decrease absorbency as required by individual animals. Furthermore, the design of the present invention ensures that the absorbent material is properly positioned and will remain in place.

U.S. Pat. No. 4,577,591 (Wesseldine, 1986) discloses an incontinence and surgical protective device for animals. The device includes a flexible pad holder with a pocket for removably containing a disposable pad. The pad itself has a semi-rigid frame, and elastic straps secure the pad holder to the animal's torso.

U.S. Pat. No. 5,555,847 (Kelly, 1996) describes a disposable dog diaper made of waterproof plastic sheet material. The diaper is stitched so as to form an internal pocket for receiving solid excrement. A stitched-in absorbent pad extends forwardly from the pocket and receives liquid excrement. The diaper is secured on the animal with hook-and-loop fasteners on the ends of the diaper.

U.S. Pat. No. 6,142,105 (McKnight, 2000) involves a diaper garment for household pets exhibiting incontinence. The garment has top, bottom and side panels that are configured to surround the back, rear end, underside and flask area of the animal. The garment includes leg openings and a preferably elasticized tail opening. Unlike the McKnight invention, the present invention does not require the owner to insert the animal's tail and legs through openings in the device.

U.S. Pat. No. 6,368,313 (Howard, 2002) provides a dog diaper system comprised of pants that are worn over the dog's hindquarters and a strap that couples the front end of the pants the dog's neck. As with the McKnight invention, this system requires the owner to insert the animal's tails and legs through openings in the pants. A pad is coupled to the pants on the interior surface of the lower panel.

U.S. Pat. No. 6,675,745 (Brewington, 2004), and U.S. Pat. No. 6,837,191 (Brewington, 2005) disclose a pet diaper garment that is comprised of an absorbent garment portion and a bib strap. The absorbent garment is comprised of multiple segments that join together to form leg and tail holes. The leg and tail holes, as well as the bib strap, are elasticized. In one embodiment, the various segments are joined together with hook-and-loop fasteners.

U.S. Pat. No. 6,895,901 (Howard, 2005) shows a dog diaper system comprised of pants, an upper strap that surrounds the dog's neck, and lower straps that extend around the dog's haunches. The pants are secured to the dog with hook-and-loop fasteners. An absorbent pad is coupled to the inside of the pants with an adhesive.

U.S. Pat. No. 7,753,008 (Krenkel, 2010) covers a harness for securing a diaper to a dog or act. The harness has first and second strap members that form a first intersection close to the first ends of the first and second strap members and a second intersection closer to the second ends of the first and second strap members than the first intersection. The first strap member forms a loop between the first and second intersections and encircles the animal's chest. The second strap member forms an adjustable loop that extends around tire animal's belly. The first and second ends of the first strap member are secured to the diaper.

U.S. Pat. No. 8,302,565 (Williams, 2012) provides an animal garment configured to receive a disposable pad on the underside of the garment. The garment is comprised of first and second panels that are connected by a central strap. The garment is held in place via shoulder straps and the central strap, which loops around the animal's tail and attaches to a rear edge of the first panel of the garment.

U.S. Pat. No. 8,992,495 (Howell, 2015) discusses a wrap-around canine utility harness with a detachable integral diaper that covers the anus and urethra. The harness itself is comprised of a fabric wrap in two perpendicularly connected sections, one of which encircles the animal centrally and the other of which extends longitudinally along the animal's ventral and dorsal sides. An absorbent pad may be coupled to the interior liner of the diaper.

U.S. Patent Application Pub. No. 2004/0074450 (Soares et al) discloses a dog diaper comprising a body band that is secured around the dog's waist and an elongate covering with a stiffening member that extends from the mid-section of the body band and covers the dog's genital area without overlapping its anal area. A pair of elastic straps connect the body band to the elongate covering. A disposable absorbent pad is affixed to the inner surface of the elongate covering and body band. A chest cover extends from the forward edge of the body band to cover a portion of the dog's chest area.

U.S. Patent Application Pub. No. 2006/0196447 (Poh-Beyerlein et al.) provides an animal diaper system that retains a disposable pad against an animal. The system includes a pair of suspender straps that extend front the front end of the longitudinal portion of the cross support through the animal's front legs, around the animal's neck, and attach to the girth portion of the cross support on the animal's top side. The girth portion has attachable distal ends for securing the girth portion around the animal.

U.S. Patent Application Pub. No. 2007/0012263 (Hammonds) describes a garment designed to prevent animals from marking territory with urine. The invention is comprised of little boys' underwear (pants) with leg and tail holes, a pair of back straps that attach the pants to the dog's collar, and a belly strap that also attaches to the dog's collar. The straps connect to the collar via a front-upper cross strap connector.

It is an object of the present invention to provide a device that fits the animal securely, accommodates different levels of absorbency, and is easy to install and remove. It is a farther object of the present invention to provide a device that can be used with existing harness systems. Furthermore, the removable absorption pod of the present invention allows the diaper itself to be used multiple times before it needs to be washed.

BRIEF SUMMARY OF THE INVENTION

The present invention is a urinary incontinence device for animals comprising: a main panel comprising a first wing, a center section, a second wing, and a crotch section; wherein the first wing, center section, and a crotch section are laterally aligned to form a single rectangular shape; wherein the first wing, the center section, and the second wing and the crotch section are comprised of three layers of fabric cut from the same pattern, the three layers of fabric including an outer waterproof cover, an intermediate absorbent layer, and an inner wicking layer; wherein the intermediate layer is situated between the outer waterproof cover and the inner wicking layer; wherein the center section is situated in a center of the main panel; wherein the first wing extends outwardly from the center section along a lateral axis that is aligned with the center section and the second wing, and the second wing extends outwardly from the center section along the same lateral a removable absorption pod comprised of a waterproof outer holder and one or more absorbent cloths contained within the waterproof outer holder, the removable absorption pad being removably attached to the center section of the main panel; and a pair of suspender straps extending perpendicularly to and from a front edge of the first and second wings, the suspender straps being configured to attach to a harness; wherein each suspender strap terminates in a removable harness adapter; and wherein the harness adapter is attached to the suspender strap via a quick-release connector.

In one embodiment, the crotch section is triangular in shape, the triangular shape having a central axis, a base that is integral with the center section, and a tip that is oriented so that the central axis of the triangle is perpendicular to the lateral axis along which the first wing, the center section, and the second wing are aligned. Preferably, the invention further comprises a dart that extends from the tip of the triangular shape to the base of the triangular shape.

In an alternate embodiment, the crotch section is rectangular in shape, with a longitudinal axis that is perpendicular to the lateral axis along which the first wing, the center section, and the second wing are aligned. Preferably, the first wing is the same size as the second wing, and the crotch section is the same size as the first or second wing.

In a preferred embodiment, the main panel nattier comprises a perimeter, and the entire perimeter of the main panel is finished with a continuous elastic binding to form a continuous hem. In one embodiment, the three fabric layers comprising the main panel are gathered as the elastic binding is stitched to the fabric layers to form three discrete stretchable portions of the perimeter, the first discrete stretchable portion being located in a center of a front edge of the main panel, and the second and third discrete stretchable portions being located on either side of the triangular shape of the crotch section, commencing at the base of the triangular shape and extending partway along first and second sides of the triangular shape toward the tip of the triangular shape. In an alternate embodiment, the three fabric layers comprising the main panel are gathered as the elastic binding is stitched to the fabric layers to form two discrete stretchable portions the perimeter, the first discrete stretchable portion being located in a center of a front edge of the main panel, and the second discrete stretchable portion being located around an entire perimeter of the crotch section.

In one embodiment, a pair of joinder straps extends outwardly from the tip of the triangular shape to form a triangle that is a mirror image of the triangular shape of the crotch section; and a distal end of each joinder strap connects via a buckle part on the joinder strap to a corresponding buckle part situated on a rear edge of the first or second wing. In an alternate embodiment, a pair of joinder straps extends outwardly from each of two rear corners of the rectangular crotch section; and a distal end of each joinder straps connects via a buckle part to a corresponding buckle part situated on a rear edge of the first or second wing.

In a preferred embodiment, the first wing comprises at least one strip of a hook-and-loop fastener on an outward end of the first wing on an inside surface of the first wing; the second wing comprises at least one strip of a hook-and-loop fastener on an outward end of the second wing on an outside surface of the second wing; and the hook-and-loop fasteners are configured so that when the first wing is wrapped over and onto the second wing, the hook-and-loop fasteners on the inside surface of the first wing are aligned with the hook-and-loop fasteners on the outside surface of the second wing. Preferably, the waterproof holder comprised of a single layers of waterproof fabric; and the fabric comprising the waterproof holder is gathered around an entire perimeter of the waterproof holder and sewn with an elastic binding so as to create a stretchable perimeter. In one embodiment, the waterproof holder of the absorption pod is the same size as the center section of the main panel. In another embodiment, the waterproof holder of the absorption pod is the same size as the center section of the main panel and at least a portion of the crotch section.

In a preferred embodiment, the suspender straps are adjustable in length and elastic. The joinder straps are preferably adjustable in length and elastic.

REFERENCE NUMBERS

1 Present invention (male version/embodiment)
2 Present invention (female version/embodiment)
3 Harness system
4 Main panel 4a First wing (of main panel)
4b Second wing (of main panel)
4c Center section (of main panel)
4d Crotch section (of main panel)
4e Dart (in crotch section of main panel)
4f Outer (waterproof) layer of main panel
4g Intermediate (absorbent) layer of main panel
4h Inner (wicking) layer of main panel
5 Elastic binding
6 Hook-and-loop fasteners (on first wing)
Hook-and-loop fasteners (on second wing)
8 Waterproof holder (for removable absorption pads), male embodiment
8a Snap (on waterproof holder), male embodiment
9 Absorbent cloth(s), male embodiment
10 Snap (in center section of main panel)
11 Waterproof holder (for removable absorption pads), female embodiment
11a Snap (on waterproof holder), female embodiment
12 Absorbent cloth(s), female embodiment
13 Suspender strap
13a Harness adapter
13b Quick-release connector (on harness adapter)
14 Joinder straps, male embodiment
15 Buckles (quick-release)
16 Joinder straps, female embodiment
17 Ring connector

DETAILED DESCRIPTION OF INVENTION

Figure 1:
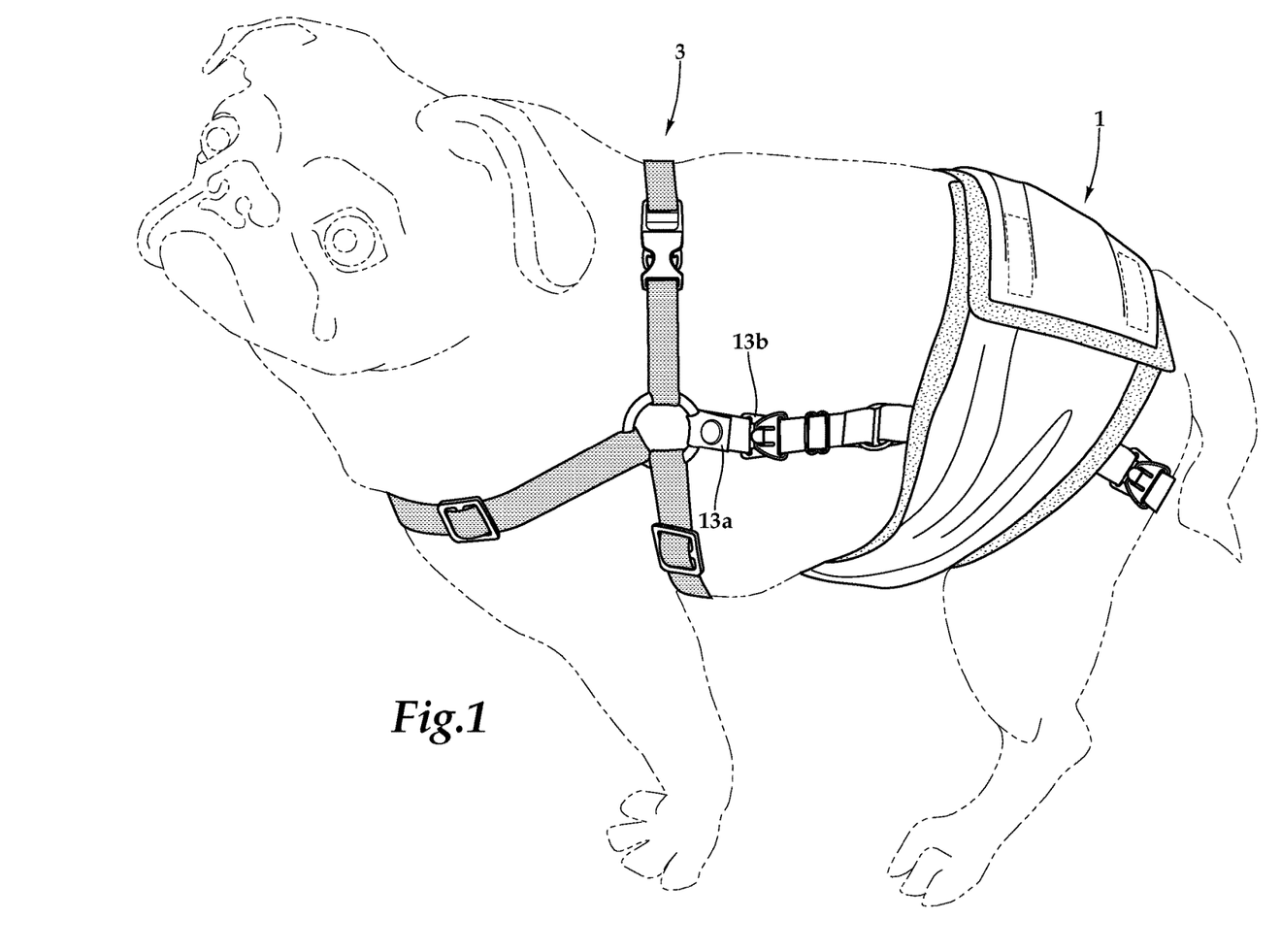
FIG. 1 is a perspective view of a first embodiment of the present invention worn on a male dog.

FIG. 1 is a perspective view of a first embodiment of the present invention worn on a male dog. The present invention encompasses both male 1 and female 2 versions (or embodiments) of the incontinence device. The male version is shown in FIGS. 1, 2A, 2B, 2C and 4, and the female version is shown in FIGS. 3A, 3B, 3C and 5. The male and female versions of the present invention are structurally similar, with the exception of the differences discussed below. Both embodiment are designed to be used with any commercially available step-in harness system 3 that has two rings at the upper back.

Figure 2A:
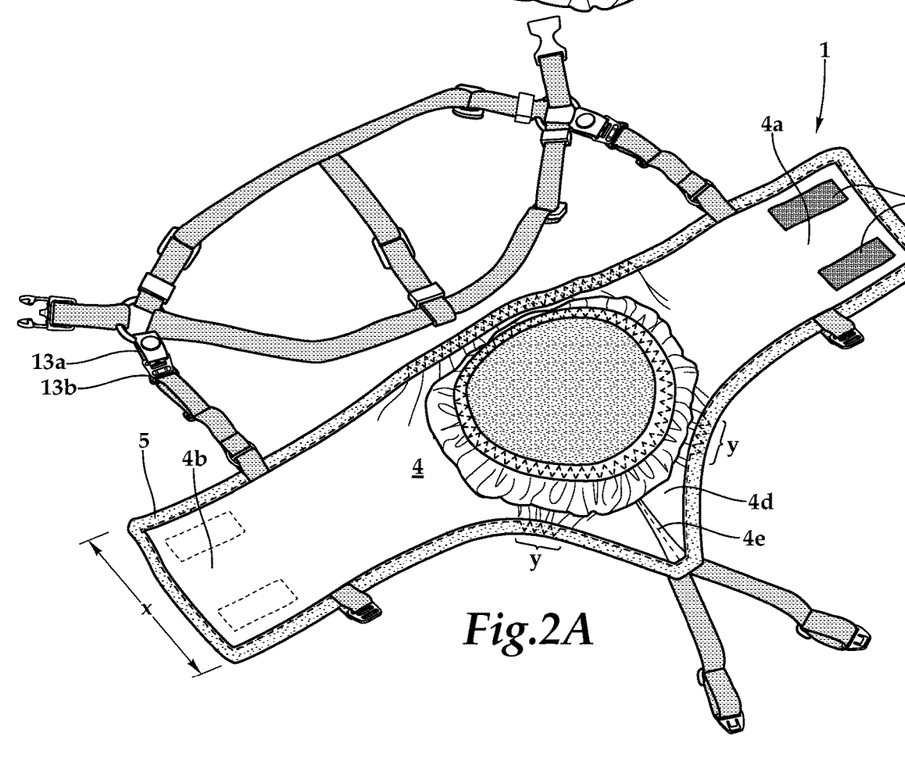
FIG. 2A is an inside perspective view of the first embodiment shown attached to a harness system.

FIG. 2A is an inside perspective view of the first embodiment shown attached to a harness system. As shown in this figure, the invention comprises a main panel 4 with a first wing 4a, a second wing 4b, a center section 4c, and a crotch section 4d. The first wing 4a, second wing 4b, center section 4c (see FIG. 6), and crotch section 4d are all preferably made from three pieces of fabric cut from the same pattern, namely, an outer waterproof cover 4f an intermediate (that is, lying between the outer and inner layers of fabric) absorbent layer 4g, and an inner wicking layer 4h (see FIG. 7). The wicking layer wicks liquid away from the animal and into the absorbent layer. The absorbent layer serves to absorb any liquid not taken up by the absorbent cloths in the removable absorption pod. In a preferred embodiment, all three layers of fabric are cut to the same pattern, which includes the two wings 4a, 4b, center section 4c and crotch section 4d. The center section 4c is situated in the center of the main panel 4. The first wing 4a extends outwardly from the center section 4c along a lateral axis that is aligned with the center section 4c and the second wing 4b. The second wing 4b extends outwardly from the center section 4c along the same lateral axis. The wings 4a, 4b are preferably the same width (measured front to back; see "X" on FIG. 2A) as the center section 4c.

The crotch section 4d in this particular embodiment is shaped like a triangle, with the base of the triangle being integral with the center section 4c and the tip of the triangle oriented so that the axis of the triangle (from the triangle tip to the middle of the base of the triangle) is perpendicular to the lateral axis along which the center section 4c and wings 4a, 4b are aligned. In a preferred embodiment, a dart 4e extends from the tip of the triangle to the base of the triangle and is tapered so that the thinnest part of the dart is located at the base of the triangle (that is, where the crotch seed on 4d adjoins the center section 4c).

Figure 8:
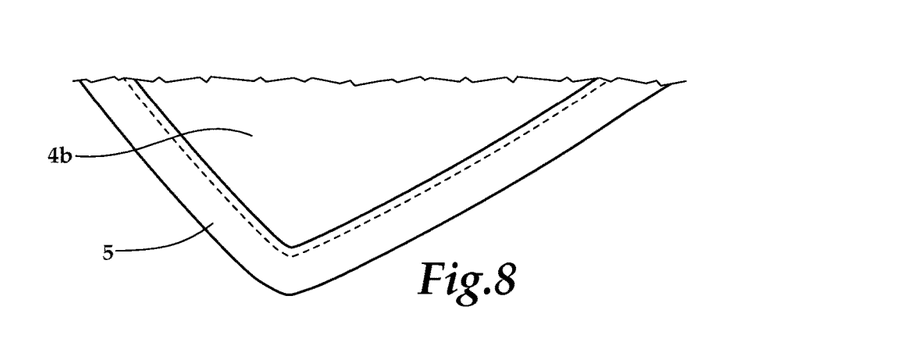
FIG. 8 is a detail view of the continuous hem (straight stitch) around the perimeter of the main panel.

In a preferred embodiment, the entire perimeter of the main panel 4 is finished with a continuous elastic binding 5 that is folded over onto both the outer and inner layers of fabric comprising the main panel and stitched (using a straight stitch; at the inside edge of the binding (see FIG. 8) to form a continuous hem. In three places on the main panel 4, the three fabric layers are gathered as the elastic is stitched onto them, and the type of stitch used in these three locations is different than the stitch used on the elastic around the remainder of the perimeter of the main panel. In these three locations, a zig-zag stitch is used. The result is that the perimeter of the main panel 4 is gathered Into the desired shape and stretchable (elastic) in these three sections so as to provide a better fit when the device is installed on an animal. The first place in which the perimeter is elasticized (i.e., elastic binding is stretched as it is sewn to the panel with the zig-zag to create gathers) Is along the forward edge (that is, the edge oriented toward the front of the animal when the device is worn by a dog) of the center section 4c of the main panel 4. In addition, the perimeter is gathered/elasticized on either side of the triangle that forms the crotch section 4d, from the base of the triangle to about one-third of the way up the side of the triangle toward the triangle tip (see "Y" on FIG. 3A). In a preferred embodiment, these three places are the only places in which the perimeter of the main panel 4 is gathered/elasticized. Note that the gathering/elasticizing of the diaper panel creates a shallow pouch to hold the absorption pod.

In a preferred embodiment, two strips of hook-and-loop fasteners 6 are attached to (sewn onto) the outward end of the first wing 4a on the inside surface of the wing (that is, onto the inner mesh fabric layer). Similarly, two strips of hook-and-loop fasteners 7 (see FIG. 4) are attached to (sewn onto) the outward end of the second wing 4b on the outside surface of the wing (that is, onto the outer waterproof layer). The strips of hook-and-loop fasteners are preferably longer than they are wide so as to allow for greater adjustability when fitting the device to the animal. The strips of hook-and-loop fasteners are configured so that when the first wing 4a is wrapped over onto the second wing 4b, as shown in FIG. 1, the hook-and-loop fasteners 6 on the inside of the first wing 4a are aligned with the hook-and-loop fasteners 7 on the outside of the second wing 4b to secure the device onto the animal. In an alternate embodiment, snaps may be used in lieu of the hook-and-loop fasteners.

Figure 2B:
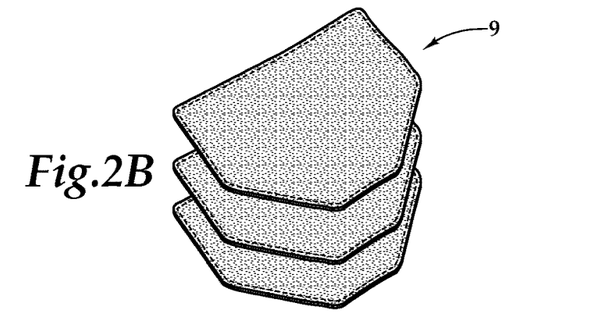
FIG. 2B is a perspective view of a plurality of absorbent cloths for use with the first embodiment.

FIG. 2B is a perspective view of a plurality of absorbent cloths for use with the first embodiment. As noted above, the present invention comprises a removable absorption pod, which is comprised of a waterproof outer holder 8 and one or more absorbent cloths 9. The absorbent cloths 9 are shown in FIG. 2B. The present invention is not limited to any particular number, shape, size or thickness of absorbent cloths, as long they fit within the waterproof holder 8.

Figure 2C:
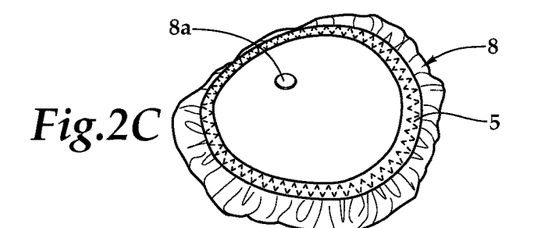
FIG. 2C is a perspective view of the waterproof holder for the absorbent cloths of the first embodiment.

FIG. 2C is a perspective view of the waterproof holder for the absorbent cloths of the first embodiment. The waterproof holder 8 is preferably comprised of a single layer of waterproof fabric (preferably the same fabric that is the outer layer of the main panel 4) around which is sewn the same elastic binding 5 as described above. On the waterproof holder 8, however, the fabric is gathered all along the perimeter of the holder, and the binding is stitched using a zig-zag stitch, so that the entire perimeter of the holder 8 is stretchable (elastic). The waterproof holder 8 is preferably sized so that it is roughly the same size as the center section 4c of the main panel 4. The waterproof holder 8 preferably comprises a snap 8a (male portion) that snaps onto a snap 10 (female portions on the inside of the center section 4c of the main panel 4 (see FIG. 6). In the embodiment shown, the snap 8a is situated off-center relative to the center of the waterproof holder 8; in an alternate embodiment, the snap is centered on the waterproof holder. In a preferred embodiment, the absorbent pod is shaped to fit into the diaper, including extending to some degree into the crotch section; the preferred shapes of the absorbent cloths are shown in FIGS. 2B and 3B. The snap 10 is preferably situated off-center relative to the center of the center section 4c, along the longitudinal (that is, from to back) axis of the center section 4c but closer to the front of the center section 4c than the back of the center section (see also FIG. 4). The absorption pod is easily secured to the device by snapping it onto the inside of the main panel and removed from the device by unsnapping it. Because the animal's urine is contained within the absorption pod, the pod may be removed and washed and the rest of the device re-used multiple times before washing is needed. The absorbent cloths 10 are preferably made of absorbent and washable material (not disposable).

Figures 3A, 3C:
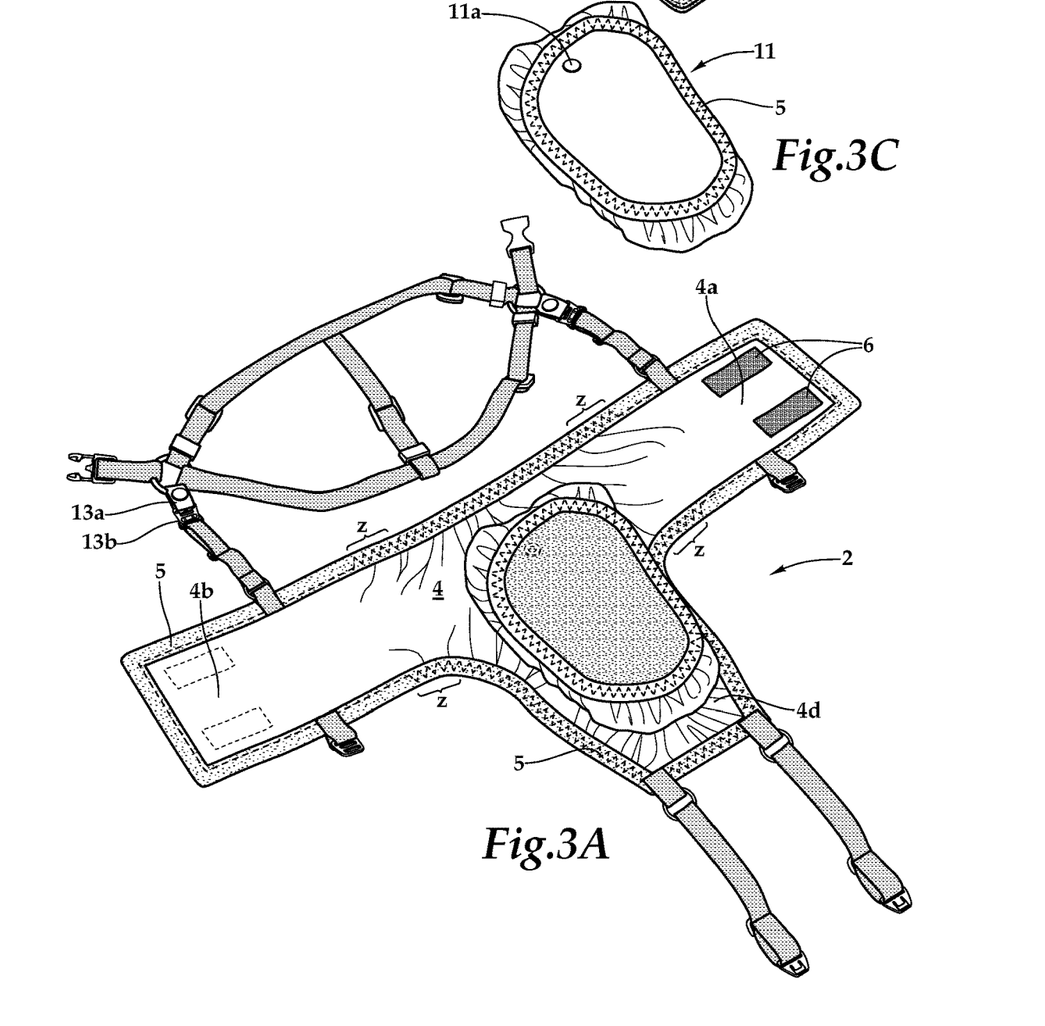
FIG. 3A is an inside perspective view of a second embodiment of the present invention shown attached to a harness system.
FIG. 3C is a perspective view of the waterproof holder for the absorbent cloths of the second embodiment.
Figure 3B:
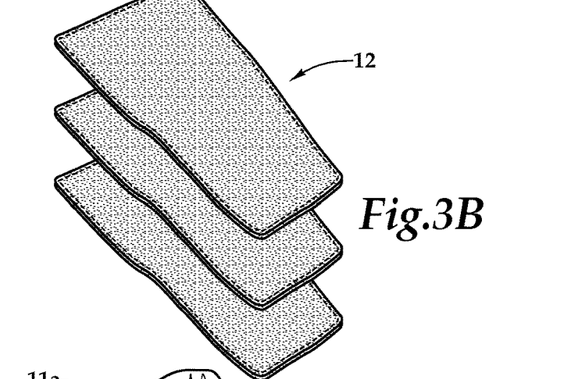
FIG. 3B is a perspective view of a plurality of absorbent cloths for use with the second embodiment.

FIG. 3A is an inside perspective view of a second embodiment of the present invention shown attached to a harness system. This embodiment is identical to the first (male) embodiment described above, with the following exceptions. The primary difference between the two embodiments relates to the shape and size of the crotch section 4d. In the male embodiment, the crotch section 4d is triangle-shaped and relatively small. In the female embodiment, the crotch section 4d is rectangular and relatively large (as compared to the male version). The longitudinal axis of the rectangle comprising the crotch section 4d in the embodiment shown in FIG. 3A is perpendicular to the lateral axis shared by the first wing 4a, second wing 4b and center section 4c. In overall area, the crotch section 4d of the female version is roughly the same size (area) as the first wing 4a or second wing 4b (in other words, the crotch section 4d is roughly the same size as one of the wings).

Figure 6:
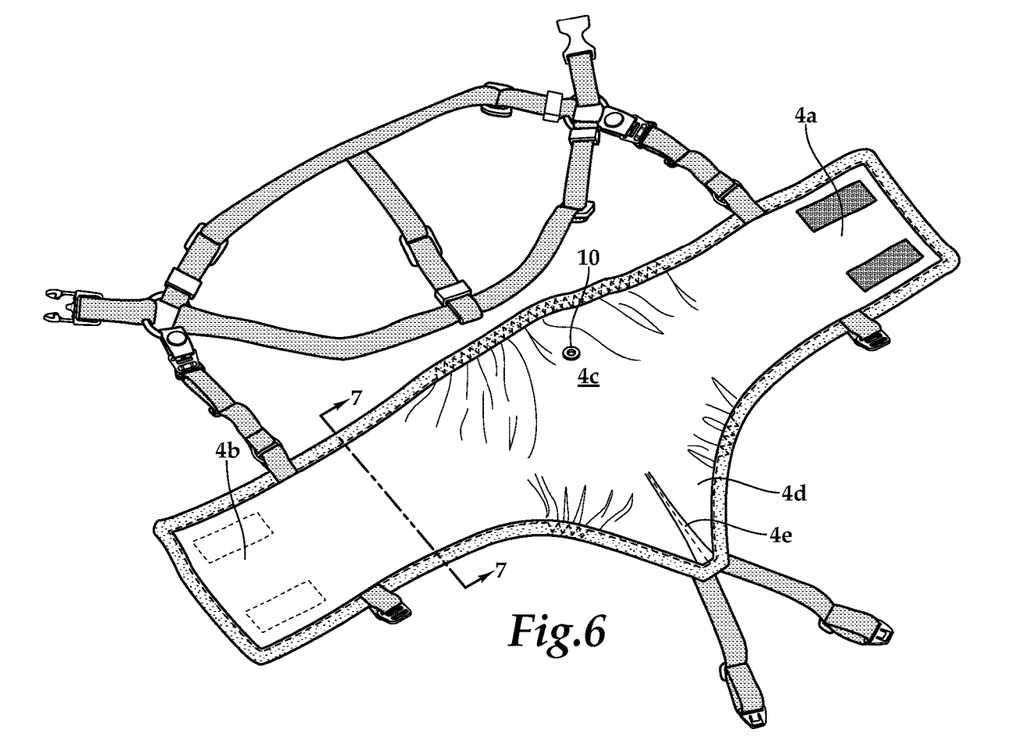
FIG. 6 is an inside perspective view of the first embodiment shown attached to a harness system hut without the removable absorption pod.
Figure 7:
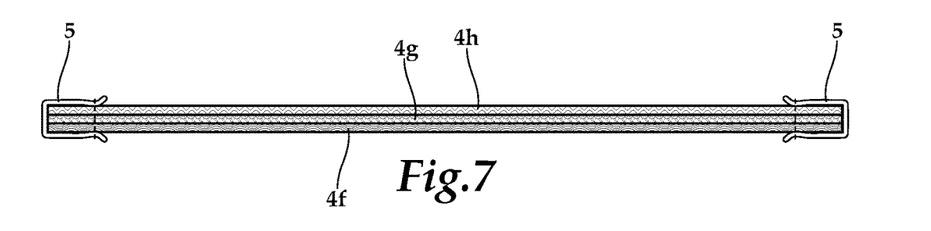
FIG. 7 is a detail view of the three layers of fabric comprising the main panel.
Figure 9:
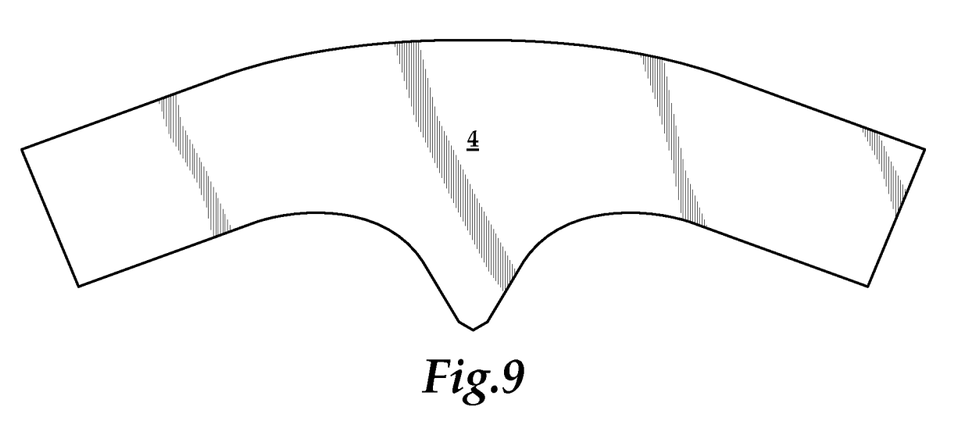
FIG. 9 is a plan view of the male embodiment construction pattern.
Figure 10:
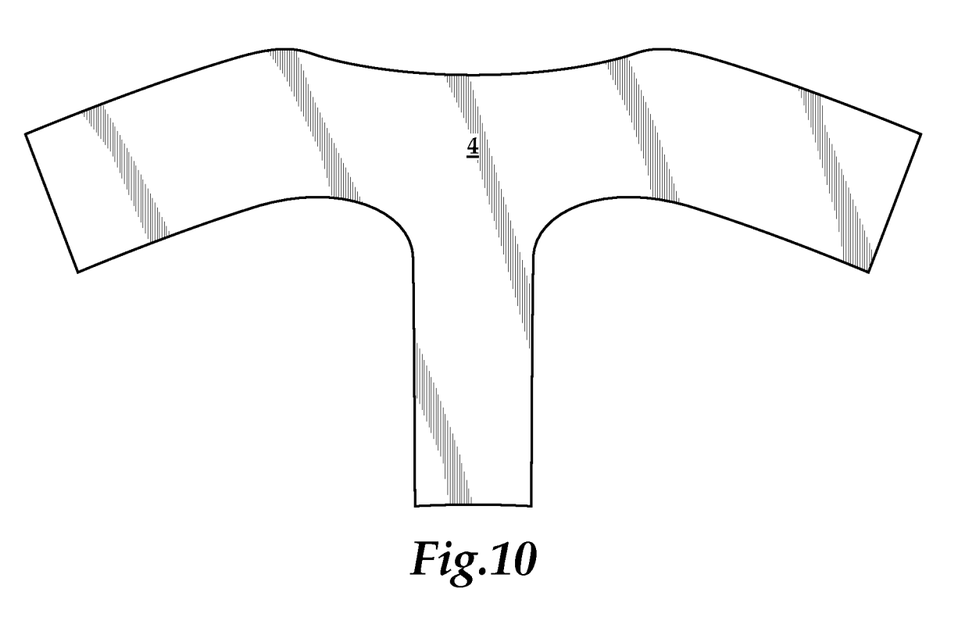
FIG. 10 is a plan view of the female embodiment construction pattern.

In this embodiment, the perimeter of the main panel is gathered/elasticized (i.e., stretchable) at the front end of the center section 4c, as in the male version; however, the entire perimeter of the rectangular crotch section 4d is also gathered/stretchable, unlike in the male version, as is a portion of the inward ends (that is, the ends of the wings where they adjoin the center section 4c) of both wings (see "Z" on FIG. 3A). Note that in the female version, as in the male version, the entire binding 5 is elastic; however, the perimeter is only stretchable where the elastic binding is stretched as it is sewn with the zig-zag stitch to gather the fabric layers. As shown in FIG. 6, the first wing 4a, second wing 4b, and center section 4c form one continuous rectangle; this is true of both the male and female embodiments. (A broken line has been added to FIG. 6 to represent the boundary between the center section 4c and the crotch section 4d.) FIGS. 9 and 10 are respective plan views of the male and female construction patterns. In the male embodiment shown in FIG. 9, the pattern is preferably bowed or arched outward (convex) in the center of the top part of the pattern. In the female embodiment shown in FIG. 10, the pattern is preferably bowed or arched inward (concave) in the center of the top part of the pattern. In the male version, the convex shape creates a deeper "pouch" for the male pod, the bulk of which is located in the center of the panel. In the female version, the concave shape creates more space for the animal's rib cage, which is necessary because the pod extends more rearward than in the male embodiment. In both embodiments, once the fabric is gathered and the elastic binding stitched to it, the overall footprint of the panel (minus the crotch section) is rectangular in shape, as noted above.

FIG. 3B is a perspective view of a plurality of absorbent cloths for use with the second embodiment. As with the male version, the absorbent cloths 12 used in the female version may be of any size, shape, thickness or number, as long as they fit within the waterproof holder 11.

FIG. 3C is a perspective view of the waterproof holder for the absorbent cloths of the second embodiment. As shown in this figure, the snap 11a (male portion) is preferably situated along the longitudinal (that is, front to back) axis of the waterproof holder 11 proximate to the center of said axis. The snap 10 (female portion) on the inside of the main panel 4 is preferably situated along the longitudinal (that is, front to back) axis of the center section 4c proximate to the corner of the center section 4c (see FIG. 5). The waterproof holder 11 of the female embodiment is preferably trapezoid in shape, which allows for more absorbs material in the front end of the diaper arm a thinner area at the rear end of the crotch section to fit into the narrower crotch section. As in the male version, the entire perimeter of the waterproof holder 11 is elasticized, as described above. The elasticizing around the perimeter of the waterproof bolder in both the male and female versions ensures that the absorbent cloths 9, 12 will be contained within the waterproof holder 8, 11.

Figure 4:
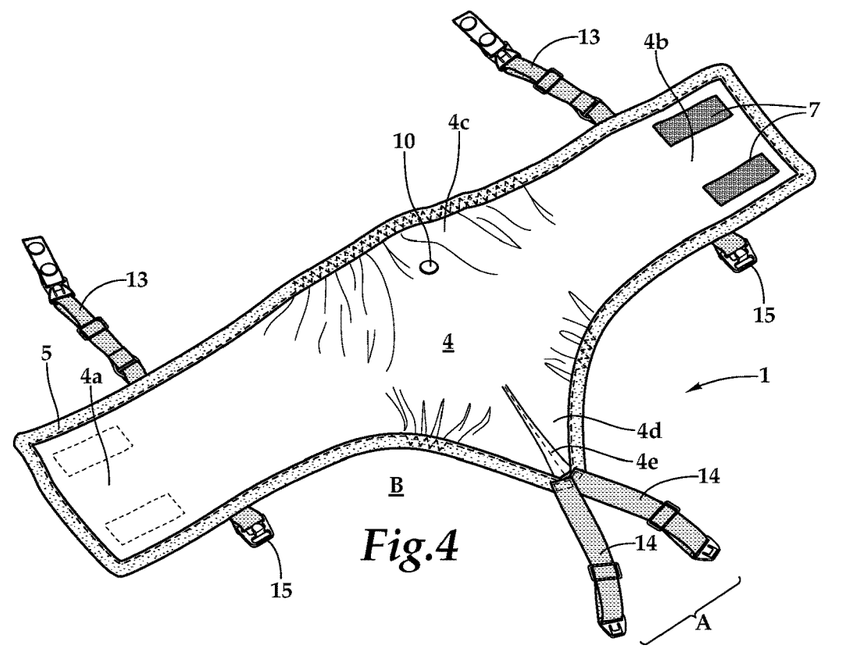
FIG. 4 is an outside perspective of the first embodiment shown without the harness system.
Figure 5:
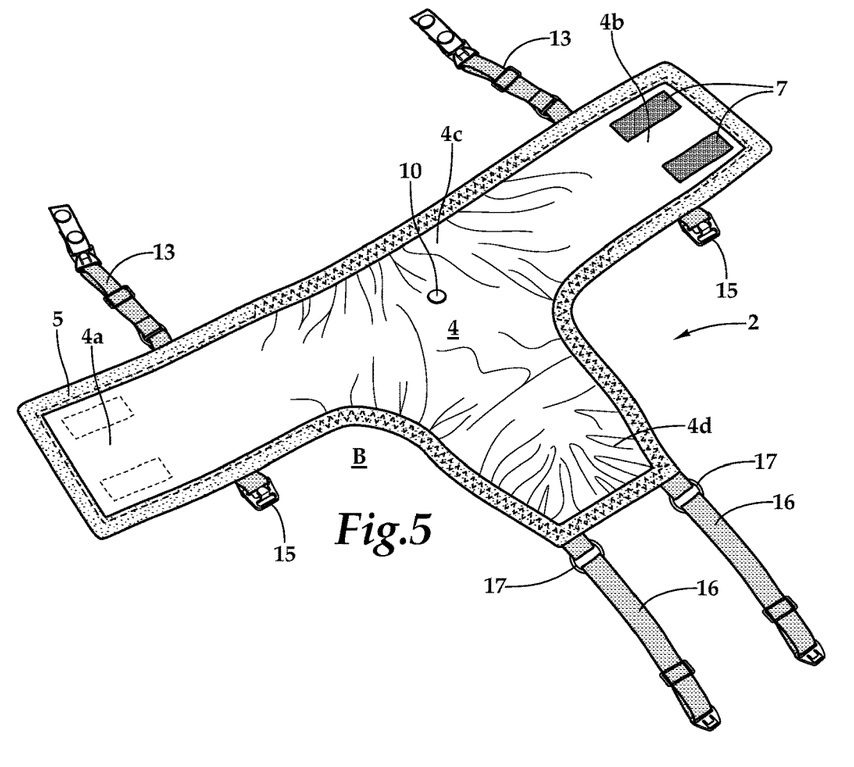
FIG. 5 is an outside perspective view of the second embodiment shown without the harness system.

FIG. 4 is an outside perspective view of the first embodiment shown without the harness system, and FIG. 5 is an outside perspective view of the second embodiment shown without the harness system. As shown in these figures, a pair of suspender straps 13 extend perpendicularly to (and from) the front edge of the first and second wings 4a, 4b interior to the hook-and-loop fasteners 6, 7; in other words, the suspender straps 13 are attached to the front edge of the wings 4a, 4b between the front edge of the center section 4c and the hook-and-loop fasteners, at the approximate center of the front edge of each of the wings. As shown in FIG. 3A, the suspender straps 13 are used to connect the present invention to an existing dog harness system 3 (see also FIG. 1). The suspender straps 13 are preferably adjustable in length and elastic. In a preferred embodiment each suspender strap 13 preferably terminates its a removable harness adapter 13a that consists of the same elastic strapping as the rest of the suspender strap and that connects to the harness 3 by looping through the harness ring and then snapping in place. The harness adapter 13a is preferably attached to the rest of the suspender strap 13 via a form of quick-release connector 13b. Note that the snaps of the harness adapters 13a are shown open in FIGS. 4 and 5.

In the male version shown in FIG. 4, a pair of joinder straps 14 extends outwardly from the tip of the triangle such that the two joinder straps 14 themselves form a triangle that is the mirror image of the triangle of the crotch section 4d. (The "base" of the triangle formed by the joinder straps 14—see "A" on FIG. 4—is the same width as the base of the triangle-shaped crotch section 4d). The distal ends of each of the joinder straps 14 connect via buckle parts on the joinder straps 14 to corresponding buckle parts 15 situated on the rear edges of the first and second wings 4a, 4b. When the device is worn by an animal, the animal's legs extend through the loop formed by the joinder straps 14 and buckles 15 (see "B" on FIG. 4). Note that the buckles 15 on the rearward edges of the wings are preferably slightly offset to the outside relative to the longitudinal axis of the suspender straps 13. The joiner straps 14 are preferably adjustable in length and elastic.

In the female version shown in FIG. 5, a pair of joinder straps 16 extends outwardly from each of the rear corners of the rectangular crotch section 4d. The distal ends of each of the joinder straps 16 connect via buckle parts on the joinder straps 16 to corresponding buckle parts 15 situated on the rear edges of the first and second wings 4a, 4b. When the device is worn by an animal, the animal's legs extend through the loop formed by the joinder straps 16 and buckles 15 (see "B" on FIG. 5). Note that the buckles 15 are preferably situated along the same longitudinal (front to back) axis as the suspender straps 13. The joinder straps 16 are preferably adjustable in length and elastic. The buckles 15 on both the male and female embodiments are preferably quick-release fasteners. The ring connectors 17 on the joinder straps 16 allow the straps 16 to swivel on the ring connectors 17, thereby affording a better fit on a female dog.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A urinary incontinence device for animals comprising:
   (a) a main panel comprising a first wing, a center section, a second wing, and a crotch section, wherein the main panel configured to fit around the belly of an animal; wherein the first wing, center section, and crotch section are laterally aligned to form a single rectangular shape; wherein each of the first wing, the center section, and the second wing has a width that extends front to back, and wherein the width of each of the first and second wings is the same as the width of the center section; wherein the first wing, the center section, the second wing and the crotch section are comprised of three layers of fabric cut from the same pattern, the three layers of fabric including an outer waterproof cover, an intermediate absorbent layer, and an inner wicking layer; wherein the intermediate layer is situated between the outer waterproof cover and the inner wicking layer; wherein the center section is situated in a center of the main panel; wherein the first wing extends outwardly from the center section along a lateral axis that is aligned with the center section and the second wing, and the second wing extends outwardly from the center section along the same lateral axis;
   (b) a removable absorption pod comprised of a waterproof outer holder and one or more absorbent cloths contained within the waterproof outer holder, the removable absorption pod, being removably attached to the center section of the main panel; and
   (c) a pair of suspender straps extending perpendicularly to and from a front edge of the first and second wings, the suspender straps being configured to attach to a harness; wherein each suspender strap terminates in a removable harness adapter; and wherein the harness adapter is attached to the suspender strap via a quick-release connector.

2. The urinary incontinence device of claim 1, wherein the crotch section is triangular in shape, the triangular shape having a central axis, a base that is integral with the center section, and a tip that is oriented so that the central axis of the triangle is perpendicular to the lateral axis along which the first wing, the center section, and the second wing are aligned.

3. The urinary incontinence device of claim 2, further comprising a dart that extends from the tip of the triangular shape to the base of the triangular shape.

4. The urinary incontinence device of claim 1, wherein the crotch section is rectangular in shape, with a longitudinal axis that is perpendicular to the lateral axis along which the first wing, the center section, and the second wing are aligned.

5. The urinary incontinence device of claim 4, wherein the first wing is the same size as the second wing, and the crotch section is the same size as the first or second wing.

6. The urinary incontinence device of claim 1, wherein the main panel further comprises a perimeter, and wherein the entire perimeter of the main panel is finished with a continuous elastic binding to form a continuous hem.

7. The urinary incontinence device of claim 2, wherein the three fabric layers comprising the main panel are gathered as the elastic binding is stitched to the fabric layers to form three discrete stretchable portions of the perimeter, the first discrete stretchable portion being located in a center of a front edge of the main panel, and the second and third discrete stretchable portions being located on either side of the triangular shape of the crotch section, commencing at the base of the triangular shape and extending partway along first and second sides of the triangular shape toward the tip of the triangular shape.

8. The urinary incontinence device of claim 4, wherein the three fabric layers comprising the main panel are gathered as the elastic binding is stitched to the fabric layers to form two discrete stretchable portions of the perimeter, the first discrete stretchable portion being located in a center of a front edge of the main panel, and the second discrete stretchable portion being located around an entire perimeter of the crotch section.

9. The urinary incontinence device of claim 2, wherein a pair of joinder straps extends outwardly from the tip of the triangular shape to form a triangle that is a mirror image of the triangular shape of the crotch section; and wherein a distal end of each joinder strap connects via a buckle part on the joinder strap to a corresponding buckle part situated on a rear edge of the first or second wing.

10. The urinary incontinence device of claim 4, wherein a pair of joinder straps extends outwardly from each of two rear corners of the rectangular crotch section; and wherein a distal end of each joinder straps connects via a buckle part to a corresponding buckle part situated on a rear edge of the first or second wing.

11. The urinary incontinence device of claim 1, wherein the first wing comprises at least one strip of a hook-and-loop fastener on an outward end of the first wing on an inside surface of the first wing; wherein the second wing comprises at least one strip of a hook-and-loop fastener on an outward end of the second wing on an outside surface of the second wing; and wherein the hook-and-loop fasteners are configured so that when the first wing is wrapped over and onto the second wing, the hook-and-loop fasteners on the inside surface of the first wing are aligned with the hook-and-loop fasteners on the outside surface of the second wing.

12. The urinary incontinence device of claim 1, wherein the waterproof outer holder is comprised of a single layer of waterproof fabric; and wherein the fabric comprising the waterproof outer holder is gathered around an entire perimeter of the waterproof outer holder and sewn with an elastic binding so as to create a stretchable perimeter.

13. The urinary incontinence device of claim 2, wherein the waterproof outer holder of the absorption pod is the same size as the center section of the main panel.

14. The urinary incontinence device of claim 4, wherein the waterproof outer holder of the absorption pod is the same size as the center section of the main panel and at least a portion of the crotch section.

15. The urinary incontinence device of claim 1, wherein the suspender straps are elastic and adjustable in length by looping a portion of the suspender strap over upon itself.

16. The urinary incontinence device of claim 9, wherein the joinder straps are elastic and adjustable in length by looping a portion of the suspender strap over upon itself.

17. The urinary incontinence device of claim 10, wherein the joinder straps are elastic and adjustable in length by looping a portion of the suspender strap over upon itself.

18. The urinary incontinence device of claim 9, wherein each suspender strap has a longitudinal axis that extends front to back, and wherein the buckle parts on the rear edges of the first and second wings are offset relative to the longitudinal axis of the suspender straps.

19. The urinary incontinence device of claim 10, wherein each suspender strap has a longitudinal axis that extends front to back, and wherein the buckle parts on the rear edges of the first and second wings are situated along the same longitudinal axis as the suspender straps.

20. The urinary incontinence device of claim 11, wherein the suspender straps are attached to the front edge of first and second wings between a front edge of the center section and the hook-and-loop fasteners and at a center of the front edge of each of the first and second wings.

21. The urinary incontinence device of claim 1, wherein the waterproof outer holder is attached to an inside of the center section of the main panel with a snap.

22. The urinary incontinence device of claim 2, wherein the front edge of the first wing, the front edge of the second wing, and a front edge of the center section form a top part of a pattern, and wherein the top part of the pattern is bowed outward to form a convex shape in a center of the top part of the pattern.

23. The urinary incontinence device of claim 4, wherein the front edge of the first wing, the front edge of the second wing, and a front edge of the center section form a top part of a pattern, and wherein the top part of the pattern is bowed inward to form a concave shape in a center of the top part of the pattern.

24. The urinary incontinence device of claim 4, wherein each joinder strap further comprises a ring connector that is configured to enable the joinder strap to swivel on the ring connector.

* * * * *